(12) United States Patent
Herbst

(10) Patent No.: US 6,325,955 B1
(45) Date of Patent: Dec. 4, 2001

(54) METHOD AND APPARATUS FOR CONTROLLING A SEQUENCE OF MOVEMENTS IN A PLASTIC MATERIAL INJECTION MOLDING MACHINE

(75) Inventor: Richard Herbst, Eching (DE)

(73) Assignee: Hekuma Herbst Maschinenbau GmbH, Eching (DE)

( * ) Notice: Subject to any disclaimer, the term of this patent is extended or adjusted under 35 U.S.C. 154(b) by 0 days.

(21) Appl. No.: 09/371,213

(22) Filed: Aug. 10, 1999

(30) Foreign Application Priority Data

Aug. 13, 1998 (DE) ............................................. 198 36 835

(51) Int. Cl.$^7$ ...................................................... B29C 7/04
(52) U.S. Cl. ........................ 264/40.5; 264/334; 425/139; 425/150; 425/444
(58) Field of Search ................................. 264/40.1, 40.5, 264/328.1, 334; 425/139, 150, 165, 554, 556, 589, 444, 436 RM; 901/6; 700/262, 112, 178, 188, 225; 414/225

(56) References Cited

U.S. PATENT DOCUMENTS

| | | |
|---|---|---|
| 5,250,239 | 10/1993 | Herbst . |
| 5,256,364 * | 10/1993 | Herbst .................................. 264/334 |
| 5,354,194 * | 10/1994 | Kresak ................................. 264/335 |
| 5,513,970 * | 5/1996 | Kimura et al. ....................... 264/334 |
| 5,629,031 * | 5/1997 | Ishikawa et al. .................... 264/334 |
| 6,216,058 * | 4/2001 | Hosek et al. . |

OTHER PUBLICATIONS

German language of article by Bernd F. Johannson "Automatisierte Fertigung im SpritzgieBbetrieb," in textbook Kunststofftechnik—Wirkungsfeld Spritzgiess maschine, ISBN 3-18-234185-5, pp. 183, 192–193 (1995)—no translation.

* cited by examiner

Primary Examiner—Jill L. Heitbrink
(74) Attorney, Agent, or Firm—Knobbe, Martens, Olson & Bear, LLP

(57) ABSTRACT

A plastic material injection molding machine comprises a mold with at least one movable mold portion and a movable handling system. The handling system is adapted to be moved along a predetermined trajectory and to enter between mold portions when the mold is in an open operational position. The movable mold portion has a front surface facing the handling system and defines a collision contour with respect to the handling system when the latter is moved along the trajectory during movement of the mold portion. The handling system is adapted to pass by the collision contour after the movable mold portion has moved away from the trajectory. The handling system is moved along a first path section of the trajectory before passing by the collision contour and is accelerated up to a predetermined maximum velocity. Thus, the handling system is at the maximum velocity when passing by the collision contour. The handling system is then decelerated along a second path section of the trajectory essentially to a standstill at a predetermined position between the mold portions.

21 Claims, 3 Drawing Sheets

METHOD AND APPARATUS FOR CONTROLLING A SEQUENCE OF MOVEMENTS IN A PLASTIC MATERIAL INJECTION MOLDING MACHINE

FIELD OF THE INVENTION

The present invention is related to the field of plastic material injection molding.

More specifically, the invention is related to a method and an apparatus for controlling a sequence of movements in a plastic material injection molding machine.

Still more specifically, the injection molding machine may have a mold with at least one movable mold portion. A movable handling system is also provided for unloading finished plastic material articles from the mold and/or for placing certain items into the empty cavities of the mold prior to the injection molding for embedding same in plastic material. The handling system is preferably adapted to be moved along a predetermined trajectory which, in most cases, is a linear path. The handling system thus may enter between the mold portions when the mold is open and may be retracted from the area between the open mold subsequently.

The movable mold portion has a front surface facing the handling system. The front surface defines a so-called "collision contour" with respect to the handling system when the handling system is moved along the trajectory and the movable mold portion is moved simultaneously between its open and its closed position. In order to avoid collision between these two elements, the sequence of movements of the two is controlled such that the handling system passes by the collision contour after the movable mold portion has moved away from the trajectory, i.e. has been retracted therefrom.

The invention is, hence, concerned with a method and apparatus for preventing such collisions between a handling system and a movable mold in an injection molding machine.

BACKGROUND OF THE INVENTION

A plastic material injection molding machine comprises a mold having at least one cavity for producing plastic material articles by injecting molten plastic material into the cavity. For unloading the article from the cavity it is necessary to open the mold. For that reason conventional molds of such machines normally have two mold portions which, when adjoining each other, constitute the mold. At least one of the mold portions may be moved along a first path of movement and may, thus be brought into a distance from the other mold portion. In that condition the mold is open and a handling system, for example a gripper or the like may be moved into the gap between the two mold portions for grasping and removing the finished plastic material article. As may easily be understood, the sequences of movement, i.e. the opening and the closing movement, respectively, of the mold as well as the entering and the exiting movement of the handling system must be precisely coordinated in order to avoid collisions and damages on the mold and the handling system. However, in order to achieve a high productivity corresponding to a minimum cycle time of the machine, the sequence of movements must be effected as quickly as possible with the lowermost delay times.

U.S. Pat. No. 5,250,239 discloses a method and an apparatus for controlling the sequence of movements between a mold and a handling system. The handling system comprises a gripper which, however, makes no difference for the subsequent considerations. According to that patent specification the movable mold portion and the gripper are moved under the control of "go" signals. The "go" signals are generated by utilizing as a criterion the position and the velocity of the respective other element. By doing so, it is possible to generate the "go" signal for one of the two elements already at a moment in time when the respective other element has not yet completely left the trajectory of the first element. As a consequence, the entering movement of the gripper into the mold is initiated at a moment in time when the movable mold portion has not yet entirely left the gripper's path of movement. This may be made because the gripper must first move through a certain distance before it passes by the collision contour defined by the movable mold portion. Additionally, there are delay times and reaction times causing a certain loss of time before the gripper actually starts moving after having received the "go" signal. The resulting total period of time makes it, therefore possible to effect the movement of the two element in a time-overlapping relationship.

When using a method of the afore mentioned kind one can drastically reduce the cycle times of conventional injection molding machines which mostly depend on how long the mold must remain open for unloading the finished articles. However, the method does not necessarily result in the shortest possible cycle times. One has, namely, to take into account numerous further parameters, for example the velocity and the acceleration with which the elements may be moved, in particular the maximum values for velocity and acceleration that may be set without adding damages to the structure of these elements. U.S. Pat. No. 5,250,239 mentioned above is silent to that aspect.

German text book "Wirkungsfeld Spritzgießmaschine", VDI Verlag 1995, p.p. 183 and 192–193 discloses an injection molding machine in which the movements effected by the mold and the handling system must be as fast as possible in order to shorten the cycle time of the entire process as much as possible. This means that the handling system, for example a gripper, must always be operated at the maximum possible acceleration. As a consequence, triangular velocity vs. time profiles are set within short distance (below 1,000 mm length).

However, as will be explained hereinafter, controlling the gripper to always operate at the maximum structurally possible acceleration does not necessarily mean that the sojourn time of the gripper within the open mold is in fact as short as possible. Moreover, a gripper operation under permanent maximum acceleration and deceleration, respectively, results in a maximum load alternation. This, in turn, means that there is a considerable load on the bearings of the machine which is highly disadvantageous in view of premature wear.

It is, therefore, an object underlying the present invention to provide a method and an apparatus of the kind mentioned at the outset such that the sojourn time of the handling system or gripper within the open mold is optimized to a minimum value.

SUMMARY OF THE INVENTION

These and other objects are achieved by a method of the kind mentioned at the outset comprising the following steps:

moving the handling system along a first path section of the trajectory before passing by the collision contour while accelerating the handling system along the first path section up to a predetermined maximum velocity for moving the handling system at the maximum velocity when passing by the collision contour; and decelerating the handling system along a second path section of the trajectory essentially to a stand-still at a predetermined position between the mold portions.

According to the apparatus mentioned at the outset the object is achieved by means for moving the handling system along a first path section of the trajectory before passing by the collision contour while accelerating the handling system along the first path section up to a predetermined maximum velocity for moving the handling system at the maximum velocity when passing by the collision contour; and means for decelerating the handling system along a second path section of the trajectory essentially to a standstill at a predetermined position between the mold portions.

Within the scope of the present application, the term "maximum structurally possible rate" of velocity, acceleration or deceleration shall be understood to mean the rate of velocity, acceleration or deceleration at which a particular element, in particular the movable handling system or gripper but also the movable mold portion may be moved over extended periods of time, i.e. over a very high number of production cycles. These maximum rates may lie below absolute maximum ratings when these ratings may not be set for a destruction-free continuous operation of the machine. Therefore, the fact that, for example, the gripper of a particular machine may even be operated slightly faster as is effectively done during continuous operation, is not in contradiction with the present invention.

The inventor of the present invention has discovered that in view of a minimum sojourn time of the gripper within the area between the mold portions the velocity or speed of the gripper is of much more importance than the acceleration. Of course, these two physical quantities are interrelated as known from basic dynamics, however, when the available path section along which the gripper is accelerated during its movement for entering between the open mold portions, is dimensioned too short, then the gripper may not reach the maximum possible velocity although the maximum possible acceleration was set. It may, therefore, be more advantageous to move the gripper along an extended path section, i.e. with a "run-up" between the open mold portions and to dimension the extended path section such that the gripper has reached its maximum velocity latest when passing by the collision contour.

The invention guarantees that the gripper enters into the area between the mold portions at maximum velocity. In this way it is possible to reduce the sojourn time to a minimum.

It is of no importance for the amount of sojourn time between the open mold portions how the velocity function up to maximum velocity is set (and, accordingly, the acceleration) for the gripper prior to passing by the collision contour. In view of the sojourn time it is, therefore, not necessary to accelerate the gripper outside that area at maximum acceleration. Therefore, one has further degrees of freedom for designing and dimensioning the injection molding machine and the handling system.

For making the sojourn time of the gripper in the area between the mold portions as short as possible, the gripper is moved at maximum velocity from the moment of passing by the collision contour on as long as possible and is then slowed down to an extent that a plastic material article may be picked up from the cavity, i.e. is slowed down essentially to a stand-still. Subsequently, the gripper is preferably accelerated at maximum acceleration and is withdrawn from the area between the mold portions.

As an alternative one might also think about utilizing the amount of time saved according to the invention after the gripper has passed by the collision contour, for example by decelerating the gripper at a deceleration rate which is lower than the maximum structurally possible rate of deceleration, thus reducing the mechanical stress. As a further alternative, one could accelerate the gripper while exiting from the area between the mold portion not with the maximum structurally possible rate of acceleration. In both cases the sojourn time of the gripper within that area would not be minimum. However, as already mentioned, a maximum deceleration and a maximum acceleration, respectively, result in a maximum mechanical load on the bearings due to the extreme load alternations and in a maximum power consumption by the drive motors which may result in thermal problems during continuous long-time operation. Therefore, if in a specific situation it is not absolutely necessary to reduce the sojourn time of the gripper between the mold portions to an absolute minimum, the durations of time that may be saved according to the invention may be utilized for reducing mechanical wear and energy consumption.

Insofar, the invention has the advantage that, on the one hand side, one may minimize the sojourn time of the gripper within the area between the mold portions, should this be necessary or, as an alternative, reduce the wear and the energy consumption of the machine without reducing the sojourn times compared to conventional times.

The invention may be subject to numerous advantages, alterations and modifications.

In a preferred embodiment of the inventive method the first path section ends at the collision contour such that the handling system reaches the maximum velocity essentially when passing by the collision contour.

This feature has the advantage that the first path section along which the handling system or gripper is accelerated to its maximum velocity, is no longer as is absolutely necessary under the aspects of the present invention. While doing so the required structural space of the machine is just as big as it must be in the sense of the present invention.

According to a further embodiment of the invention the handling system is moved with the maximum velocity within an area between the mold portions until the second path section begins, the handling system being then decelerated along the second path section at a predetermined constant rate of deceleration.

This feature has the advantage that the gripper during its entering movement is moved as long as possible with its maximum velocity after having passed by the collision contour. In the meaning of the present invention this feature adds to the fact that the minimum sojourn time may effectively be reached. As an alternative one may, as mentioned above, use the time saved after passing by the collision contour for other purposes. In any event due to the mentioned features the time between passing by the collision contour and reaching the position at which the gripper may pick up the finished plastic material article is minimized.

According to still another preferred embodiment of the invention the handling system is accelerated along the first path section at a predetermined constant rate of acceleration.

This measure has the advantage that the first path section may be dimensioned as short as possible. This, in turn, results in a correspondingly designed plastic material injection molding machine which may be designed very short while maintaining all of the advantages provided by the invention. This feature is of particular advantage in combination with the first preferred embodiment according to which the first path section ends at the collision contour. It should, however, be mentioned that these two features may also be used separately or in an isolated manner for reducing the overall dimensions of the machine. Another advantage of the feature is that one needs only to program one acceleration value instead of an acceleration profile (acceleration vs. time or path) comprising a large number of individual values. One can, therefore, save memory capacity.

According to still another preferred embodiment of the invention the length of the first path section is more than 10 cm, preferably is between 15 cm and 70 cm and still more preferably 20 cm and 40 cm.

These dimensions have the advantage that the inventive method may be reliably realized with today's available maximum structurally possible acceleration rates of grippers and handling systems being in the order of 50 m/s$^2$ to 60 m/s$^2$ and maximum structurally possible velocities of between 5 m/s and 6 m/s. These preferred dimensional ranges, moreover, constitute an advantageous compromise in view of the necessary design dimensions of the machine.

According to another preferred embodiment of the invention the handling system is first moved along a first portion of the first path section at a predetermined first rate of acceleration and is then moved along a further portion of the first path section at a predetermined second rate of acceleration, the second rate of acceleration being greater than the first rate of acceleration.

This feature advantageously utilizes the fact that the velocity vs. path or time function of the gripper prior to passing by the collision contour has no effect on the sojourn time of the gripper between the mold portions. The feature, therefore, has the advantage that an initial acceleration of the gripper at a low acceleration rate means lower load alternations and, hence, lower wear. After having initially accelerated the gripper, the acceleration may be increased to reach the maximum velocity within a short distance, i.e. in the interest of a small machine design. Besides the reduction in load alternation and, hence, in wear, this also results in a lower energy consumption required for accelerating the handling system.

Another advantage of this feature results in connection with a malfunction within the sequences of movement which has always to be taken into account because such malfunctions are always possible. Such a malfunction can, for example, occur when the movable mold portion is jammed and, hence, the opening motion is executed with a delay or not at all. In that case it is absolutely mandatory to abort the movement of the gripper by initiating an emergency stop for preventing collision. In many instances such malfunctions occur at the beginning of the respective phase of movement. If in such a situation the acceleration of the gripper is set relatively low at the beginning of the movement, according to the afore-described and preferred embodiment of the invention, one has more time available at the beginning of the movement phase for affecting an emergency stop of the gripper. Concurrently, the load alternation is also smaller in that case of an emergency stop.

According to a modification of the afore-mentioned embodiment the second rate of acceleration is a predetermined maximum structurally possible rate of acceleration.

This measure is another improvement of the embodiment mentioned before and, accordingly, has additional advantages. It has, for example, the advantage that the gripper is accelerated with the maximum possible rate of acceleration at least within the last section before passing the collision contour. When doing so the last section may be dimensioned shorter as compared with the situation where the gripper is moved with a rate of acceleration being lower than the structurally possible maximum rate. This, again, has advantages with the respect to the reduction of the size and dimensions of the injection molding machine.

It is particularly preferred when the further section from which on the gripper is accelerated at the maximum rate of acceleration, begins at a position from which on even an emergeny stop of the handling system could no more avoid a collision. This is, for example, the case when the gripper can no more be braked down due to its inertia without passing the collision contour. Due to the afore-mentioned configuration this last section is as short as possible and the transition time through that section is as small as possible.

According to a further embodiment of the invention the handling system, when exiting from the mold, is first accelerated at a predetermined maximum structurally possible rate of acceleration up to a predetermined maximum velocity, and is then moved at the maximum velocity until it has left an area between the mold portions.

This feature has the advantage that the sojourn time of the gripper within the area between the mold portions can also be minimized as much as possible during the exiting movement. Therefore, this feature is advantageous when the sojourn time of the gripper in the area shall in fact be reduced to its minimum.

According to still another preferred embodiment of the invention the handling system, when having left the area, is decelerated at a predetermined rate of deceleration being smaller than a maximum structurally possible rate of deceleration.

This measure, again, has the advantage that only relatively low load alternations have to be expected with the bearings of the gripper being much less stressed. Therefore, the wear is also reduced.

According to still another preferred embodiment of the invention a movement for the entering of the handling system between the mold portions is initiated prior to the opening movement of the mold.

This measure has the advantage that the inventive method may be combined with methods having an overlap of the phases of movement between the gripper and the mold portions, as known per se. Only with such a combination of features the cycle time of the injection molding machine may be minimized further to the minimization of the sojourn time.

It goes without saying that the features mentioned before and those that will be explained hereinafter in further detail, may not only be used in the particularly given combination but also in another combinations or alone without leaving the scope of the present invention.

BRIEF DESCRIPTION OF THE DRAWINGS

Preferred embodiments of the invention are shown in the drawings and will be explained in further detail thereafter.

DETAILED DESCRIPTION OF THE PREFERRED EMBODIMENT

Figure 1:
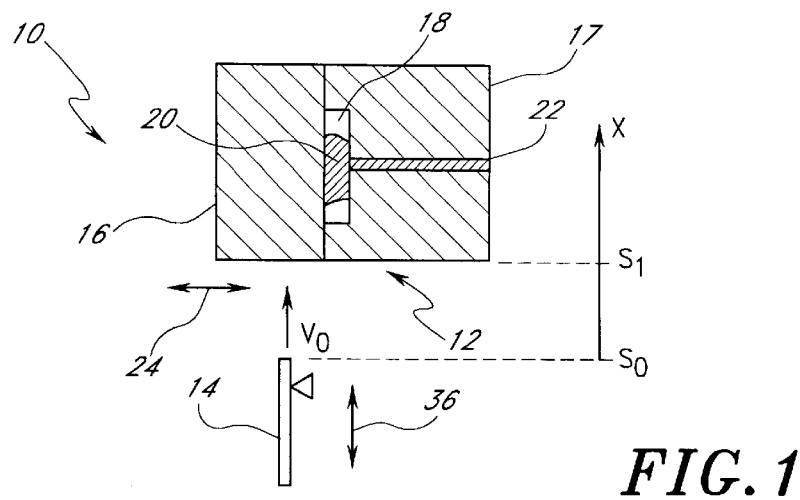
FIG. 1 is a schematic depiction of a plastic material injection molding machine according to the invention with the mold being closed, and having a handling system configured as a gripper.
Figure 2:
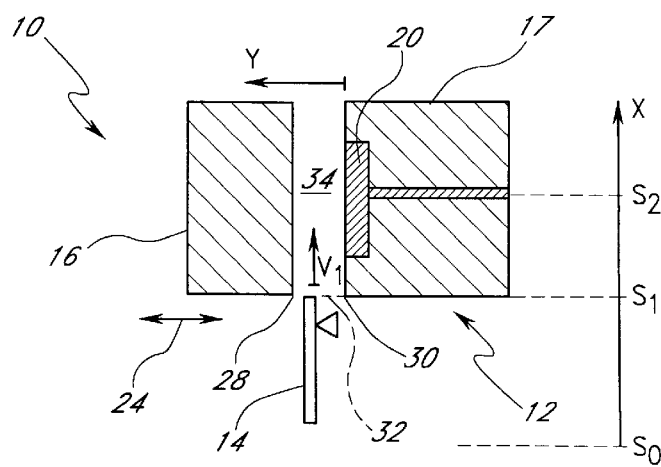
FIG. 2 shows the plastic material injection molding machine of FIG. 1 with the mold portions partially opened.
Figure 3:
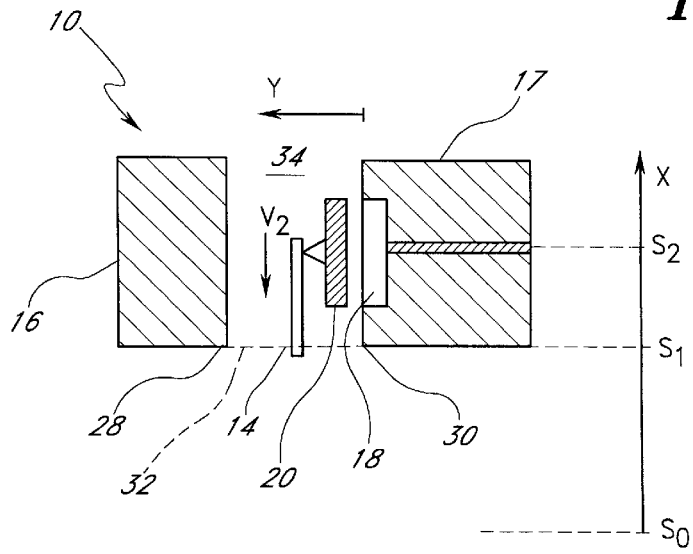
FIG. 3 shows the plastic material injection molding machine of FIG. 1 with the mold portions being entirely open.

In FIGS. 1 to 3 reference numeral 10 as a whole indicates a schematically depicted plastic material injection molding machine according to the present invention.

Plastic material injection molding machine 10 comprises a mold 12 and a handling system configured as a gripper 14. It goes without saying that the handling system may also be configured otherwise, for example with vacuum suction elements, magnetic or electrostatic grippers or the like. The handling system is utilized for unloading finished plastic material articles from the cavity or cavities within the mold when these articles are ejected by appropriate ejector pins as is well known in the art. Further, the handling system may be utilized for placing specific items into the hollow cavities prior to injecting molten plastic materials so that these items may be embedded within the finished plastic material articles. For the purpose of the present invention it is meaningless whether the gripper 14 is a component of an autonomous and separate handling system or whether it is an integral component of the plastic material injection molding machine itself.

In the present illustration mold 12 comprises two mold portions 16, 17 which adjoin each other in the depiction of FIG. 1 and, hence, constitute a hollow cavity 18. A work piece 20 or plastic material article may be produced within cavity 18 by injecting molten plastic material thereinto. For that purpose the molten material is fed to hollow cavity 18 through a channel 22.

As can be seen in FIG. 2, mold 16 is adapted to execute an opening and closing movement 24 along an axis designated as Y-axis.

Mold portions 16 and 17 on their side facing a gripper 14 have edges or areas 28, 30. Edge 28 of movable mold portion 16 defines a collision contour for the movement of gripper 14. After having passed by collision contour 32 gripper 14 reaches an area 34 between mold portions 16 and 17.

The entering and exiting movement of gripper 14 is effected along a trajectory which, in the shown example is a straight path designated as X-axis being directed perpendicular to the Y-axis of the opening and closing movement 24. However, this is not necessarily the case.

As one may see from the schematically shown phases of movement in FIGS. 1 to 3 gripper 14 starts entering into mold 12 at an initial position $S_0$. The initial velocity of gripper 14 is designated as $V_0$. While gripper 14 moves towards mold 12, movable mold portion 16 is displaced along the Y-axis, thereby opening mold 12. The movement of gripper 14 and of movable mold portion 16 are, hence, at least partially time-overlapping. Insofar, it is sufficient when movable mold portion 16 at the moment in time when gripper 14 passes by collision contour 32 is displaced such that gripper 14 just passes by edge 28 of mold portion 16 without making contact.

FIG. 2 illustrates the moment in time when gripper 14 passes by collision contour 32 being identified on the X-axis at a position $S_1$. At the moment in time gripper 14 moves with a velocity $V_1$. Gripper 14, hence, has been accelerated to that velocity $V_1$ when moving along the path section between $S_0$ and $S_1$.

It should be mentioned at this instance that edge 28 in contrast to the illustration may also be designed with a rounded shape or may be provided with a recess so that gripper 14 may approach movable mold portion 16 still closer.

In FIG. 3 movable mold portion 16 is in its opened end position. Gripper 14 has reached a position $S_2$ in which it can pick up the finished work piece or article 20 from mold 12. Insofar, it is well known in the art to provide mold 17 with ejector pins (not shown) ejecting workpiece 20 from hollow cavity 18. The ejector pins are synchronized with the movement of gripper 14.

After having picked up work piece 20 gripper 14 is retracted from mold 12 in the illustrated embodiment. Simultaneously or with appropriate time coordination movable mold portion 16 is again displaced towards mold portion 17 in order to close mold 12 for a subsequent manufacturing i.e. injection step. The coordination of the phases of movement of gripper 14 and movable mold portion 16 is effected by, for example, utilizing "go" signals mentioned at the outset.

Figure 4:
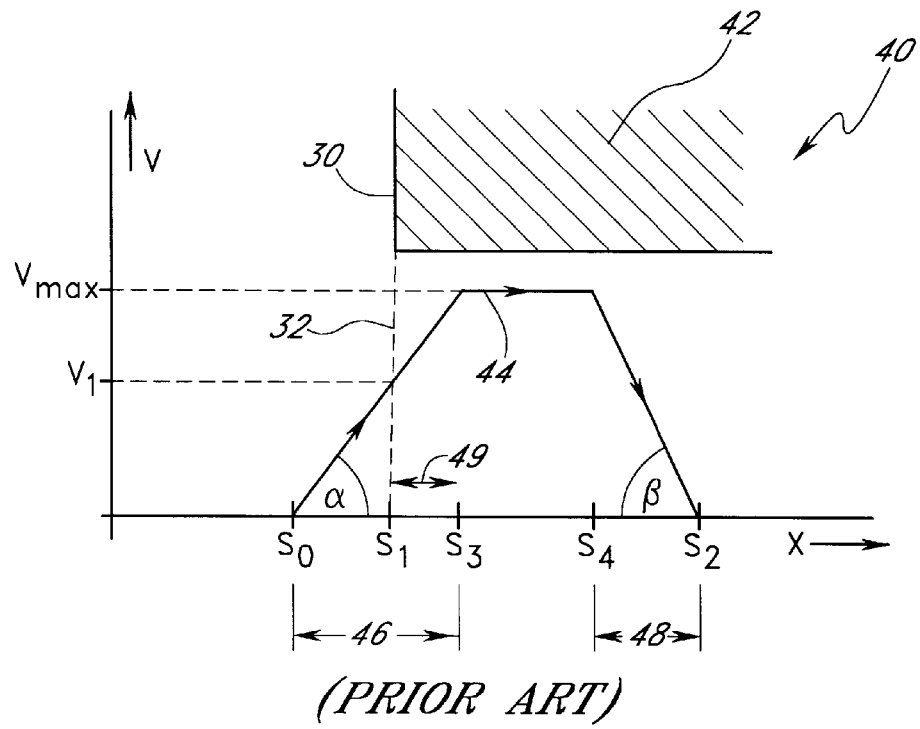
FIG. 4 shows a velocity vs. path diagram, illustrating the entering movement of the gripper into a plastic material injection molding machine according to the prior art.

FIG. 4 shows a velocity vs. path diagram for explaining the sequence of movements of gripper 14. The diagram is indicated by reference numeral 40.

The positions of gripper 14 along the X-axis are given, as already shown in FIGS. 1 to 3. Reference numeral 42 schematically indicates the position of mold portion 17. Collision contour 32 is at position $S_1$. Reference numeral 44 indicates a graph of the velocity of gripper 14 during its entering movement.

Velocity graph 44 shows a method according to the prior art. For that purpose gripper 14 is accelerated from initial position $S_0$ along first path section 46. Accordingly, velocity increases along first path section 46.

It should be noted at this instance that the acceleration of gripper 14 does not directly result from a first derivative of graph 44 because graph 44 does not show velocity vs. time but velocity vs. path instead. Nevertheless the inclination of graph 44 is anyway a measure of the prevailing acceleration.

Gripper 44 is accelerated along first path section 46 at constant acceleration, corresponding at this instance to the maximum structurally possible acceleration up to maximum velocity $V_{max.}$. Angle α shown in this illustration is a measure for the maximum acceleration. $V_1$ indicates the velocity at that moment in time when gripper 14 passes by collision contour 32. As can be seen from the graph it is smaller than maximum velocity $V_{max.}$.

According to the second part of velocity graph 44 gripper 14 is slowed down from position $S_4$ on along second path section 48 until coming to a standstill or essentially to a standstill at position $S_2$. The deceleration being indicated by angle β is the maximum structurally possible deceleration at this instance. The maximum acceleration (α) and the maximum deceleration (β) must not necessarily be equal because the deceleration is effected differently from a technical and design point of view as compared with the acceleration. In the present case the maximum deceleration (β) is higher than the maximum acceleration (α).

In the area between the first path section 46 and the second path section 48 gripper 14 is moved with its maximum structurally possible velocity $V_{max.}$. It is, however, also known in the art that path sections 46 and 48 as well as the size of the area between the mold portions 16 and 17 is dimensioned such that the velocity graph 44 assumes the shape of triangle, i.e. that the phase of acceleration along path section 46 is directly followed by a phase of deceleration along path section 48.

The key disadvantage of this prior art velocity graph 44 is portion 49 within path section 46. That portion begins at position $S_1$ in which gripper 14 passes by collision contour 32 and extends until position $S_3$ at which gripper 14 reaches its maximum velocity $V_{max.}$. Within portion 49 gripper 14 already moves within area 34, however, not yet with its maximum possible velocity $V_{max.}$. Accordingly, precious time is given away.

Figure 5:
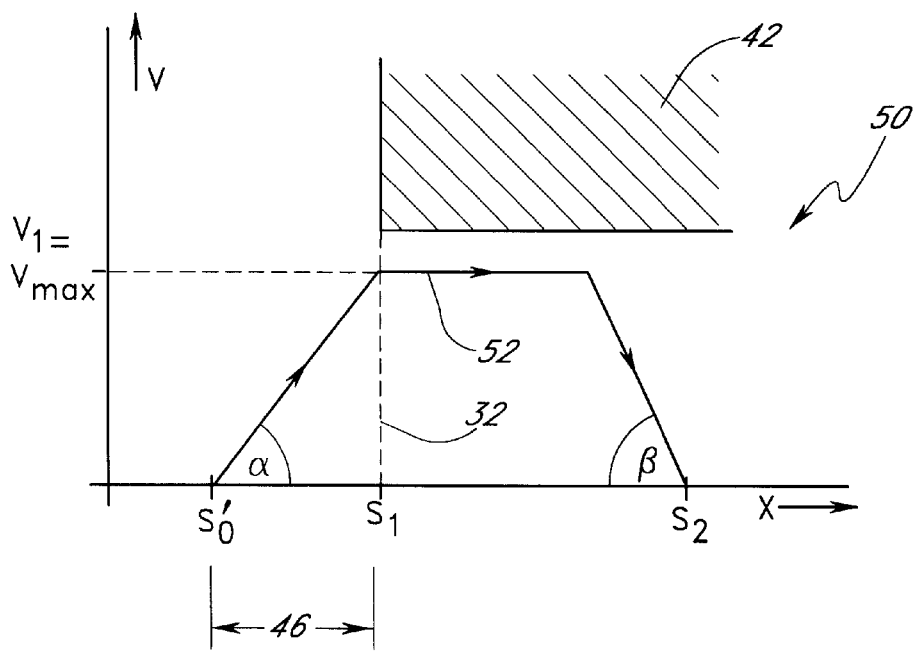
FIG. 5 shows a velocity vs. path diagram of the gripper according to the inventive method.

In FIG. 5 a velocity vs. path diagram is as a whole indicated by reference numeral 15. Like reference numerals indicate like elements having already been discussed in connection with the previous figures.

According to velocity graph 52 gripper 14 is again accelerated along first path section 46 up to a maximum velocity $V_{max.}$, however, first path section 46 being here dimensioned such that gripper 14 assumes maximum velocity $V_{max.}$ at position $S_1$ (or before). As a consequence gripper 14 passes by collision contour under maximum velocity $V_{max.}$.

Initial position $S_0$, defining the beginning of path section 46, therefore lies more distant from collision contour 32 as compare with initial position $S_0$ FIG. 4.

However, as can be seen from graph 52 in comparison with graph 44 gripper 14 within area 34 moves longer at maximum velocity $V_{max.}$ when using the inventive method. Accordingly, the average velocity that is obtained within area 34 under identical conditions is higher as compared with the graph of FIG. 4. As a consequence the sojourn time of gripper 14 within area 34 is shorter as compared with graph 44.

Figure 6:
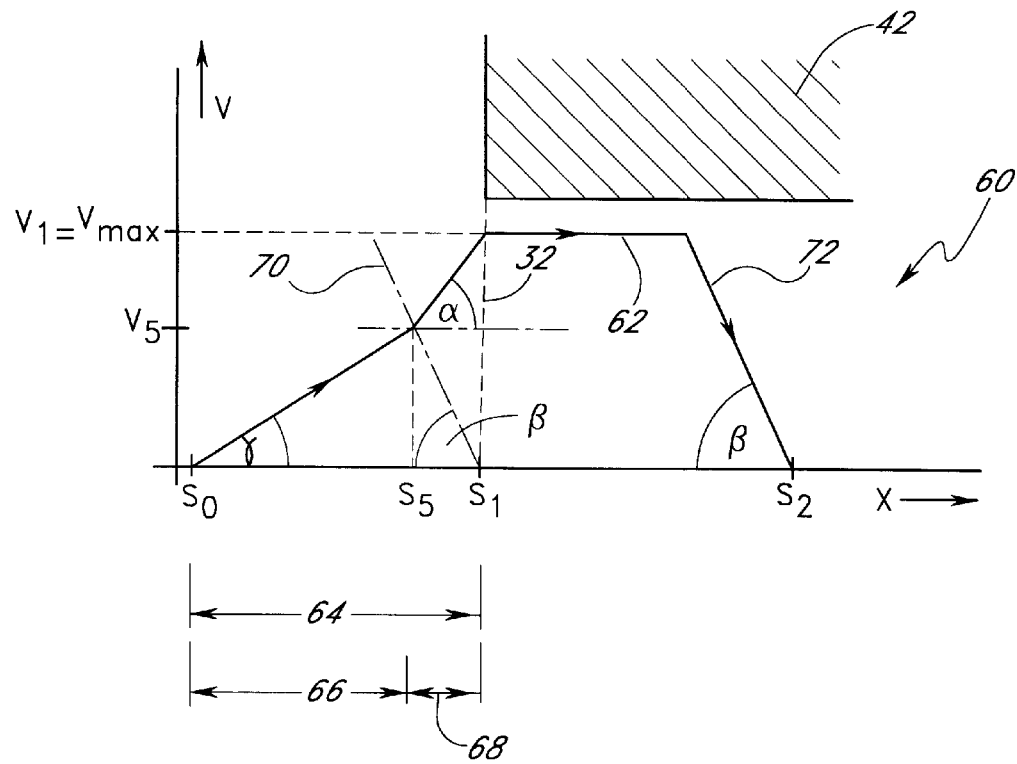
FIG. 6 shows a velocity vs. path diagram of an alternate embodiment of the inventive method.

In an alternate embodiment shown in FIG. 6 a velocity vs. path diagram is indicated as a whole by reference numeral 60. A velocity graph 62 from position $S_1$ on at which gripper 14 passes by collision contour 32, corresponds to velocity graph 52. Graph 62, however, distinguishes from graph 52 prior to passing by collision contour 32 as will be described here and after.

In this embodiment, too, gripper 14 is accelerated starting from an initial position $S_{0..}$ up to its maximum velocity along a first path section 64. When doing so maximum velocity is reached at a moment in time when gripper 14 passes by collision contour 32. However, in contrast to the embodiment described before, gripper 14 is accelerated along a first portion 66 of first path section 64 at a rate of acceleration ($\gamma$) being lower as the maximum structurally possible rate of acceleration ($\alpha$).

First portion 66 ends at a position $S_5$. At that position a further portion 68 of first path section 64 begins. Gripper 14 is accelerated along further portion 68 at the maximum rate of acceleration ($\alpha$). The length of further portion 68, therefore, corresponds to the shortest possible braking distance of gripper 14 from the velocity with which it moves at the beginning of this portion. This is illustrated by a straight line 70 showing the velocity in case that gripper 14 is broken down at maximum rate of deceleration ($\beta$).

Position $S_5$ where further portion 68 begins is the latest possible position at which an emergency stop may be initiated for braking griper 14 down to a standstill before passing by the collision contour.

Figure 7:
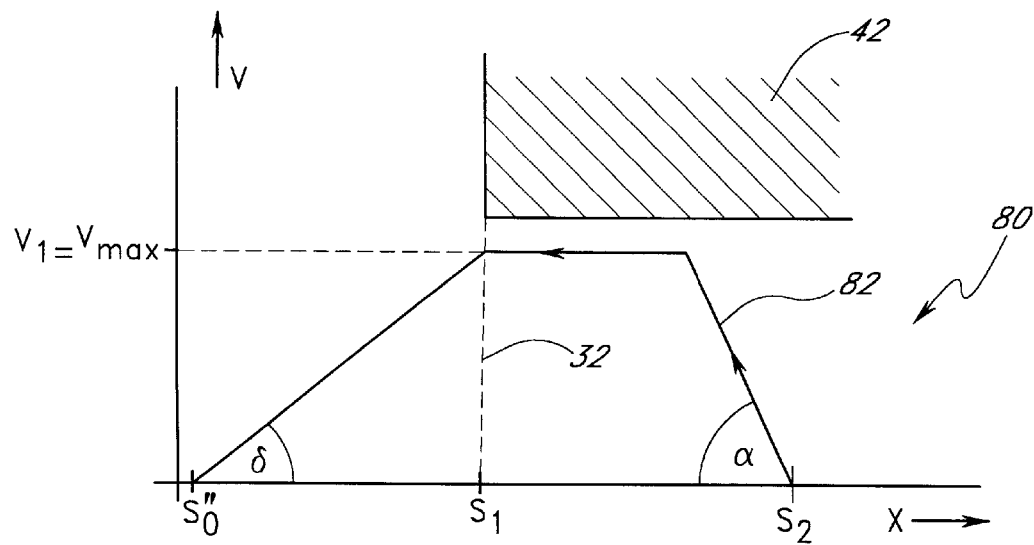
FIG. 7 shows a velocity vs. Diagram for the exiting movement of the gripper.

In FIG. 7 still another velocity vs. path diagram is indicated by reference numeral 80. Velocity graph 82 illustrates how gripper 14 is retracted from mold 20 after having picked up workpiece 20.

According to graph 82 gripper 14 is accelerated in that case starting from its end position $S_2$ with a maximum rate of acceleration ($\alpha$) up to its maximum velocity $V_{max.}$. Subsequently it is moved with maximum velocity $V_{max.}$ as long until it again passes by collision contour 32, thus leaving area 34. From this position $S_1$ on gripper 14 is decelerated at a rate of deceleration ($\delta$) being lower as the maximum possible rate of deceleration ($\beta$). Deceleration ($\delta$) is dimensioned in the illustrated case such that gripper 14 comes to a standstill at position $S_{0..}$.

Besides the embodiments described before, further embodiments of the invention are possible. For example, it must be considered within the scope of the present invention when the first path section together with the prevailing acceleration is dimensioned such that gripper 14 reaches maximum velocity not exactly when passing by collision contour 32 but already before, i.e. prior to reaching position $S_1$.

The invention may, further, be used on a plastic material injection molding machine having a stack mold, as described i.g. in U.S. Pat. No. 5,382,158.

What is claimed is:

1. A method for controlling a sequence of movements in a plastic material injection molding machine having a mold with at least one movable mold portion and a movable handling means, said handling means being adapted to be moved along a predetermined trajectory and to enter between mold portions of said mold when said mold is in an open operational position, said movable mold portion having a front surface facing said handling means and defining a collision contour with respect to said handling means when being moved along said trajectory during movement of said mold portion, said handling means being adapted to pass by said collision contour after said movable mold portion has moved away from said trajectory, the method comprising the steps of:

moving said handling means along a first path section of said trajectory before passing by said collision contour while accelerating said handling means along said first path section up to a predetermined maximum velocity at or before reaching said collision contour for moving said handling means at said maximum velocity when passing by said collision contour; and decelerating said handling means along a second path section of said trajectory essentially to a stand-still at a predetermined position between said mold portions.

2. The method of claim 1, wherein said first path section ends at said collision contour such that said handling means reaches said maximum velocity essentially when passing by said collision contour.

3. The method of claim 1, wherein said handling means is moved with said maximum velocity within an area between said mold portions until said second path section begins, said handling means being then decelerated along said second path section at a predetermined constant rate of deceleration.

4. The method of claim 1, whereinsaid handling means is accelerated along said first path section at a predetermined constant rate of acceleration.

5. The method of claim 4, wherein said first path section is longer than 10 cm.

6. The method of claim 5, wherein said first path section is between 15 cm and 70 cm long.

7. The method of claim 6, wherein said first path section is between 20 cm and 40 cm long.

8. The method of claim 1, wherein said handling means is first moved along a first portion of said first path section at a predetermined first rate of acceleration and is then moved along a further portion of said first path section at a predetermined second rate of acceleration, said second rate of acceleration being greater than said first rate of acceleration.

9. The method of claim 8, wherein said second rate of acceleration is a predetermined maximum structurally possible rate of acceleration.

10. The method of claim 8, wherein said handling system has a predetermined speed when entering said further portion of said first path section, said further portion of said first path section having a length being not greater than a braking distance of said handling system from said predetermined speed to essentially standstill at a predetermined maximum structurally possible rate of deceleration.

11. The method of claim 1, wherein said handling means, when exiting from said mold is first accelerated at a predetermined maximum structurally possible rate of acceleration up to a predetermined maximum velocity, and is then moved at said maximum velocity until it has left an area between said mold portions.

12. The method of claim 11, wherein said handling system, when having left said area, is decelerated at a predetermined rate of deceleration being smaller than a maximum structurally possible rate of deceleration.

13. The method of claim 1, wherein a movement for said entering of said handling means between said mold portions is initiated prior to said opening movement of said mold.

14. The method of claim 1, wherein a movement for said entering of said handling means between said mold portions is initiated simultaneously with said opening movement of said mold.

15. The method of claim 1, wherein said handling means is configured as a gripper.

16. An apparatus for controlling a sequence of movements in a plastic material injection molding machine having a mold with at least one movable mold portion and a movable handling means, said handling means being adapted to be moved along a predetermined trajectory and to enter between mold portions of said mold when said mold is in an open operational position, said movable mold portion having a front surface facing said handling means and defining a collision contour with respect to said handling means when being moved along said trajectory during movement of said mold portion, said handling means being adapted to pass by said collision contour after said movable mold portion has moved away from said trajectory, the apparatus comprising:

means for moving said handling means along a first path section of said trajectory before passing by said collision contour while accelerating said handling means along said first path section up to a predetermined maximum velocity at or before reaching said collision contour for moving said handling means at said maximum velocity when passing by said collision contour; and means for deceleration said handling means along a second path section of said trajectory essentially to a standstill at a predetermined position between said mold portions.

17. The apparatus of claim 16, wherein said first path section ends at said collision contour and is dimensioned such that said handling means reaches said maximum velocity essentially when passing by said collision contour.

18. The apparatus of claim 16, wherein said first path section is longer than 10 cm.

19. The apparatus of claim 18, wherein said first path section is between 15 cm and 70 cm long.

20. The apparatus of claim 19, wherein said first path section is between 20 cm and 40 cm long.

21. The apparatus of claim 16, wherein said handling means is configured as a gripper.

* * * * *